(12) United States Patent
Soda

(10) Patent No.: US 11,275,272 B2
(45) Date of Patent: Mar. 15, 2022

(54) LIQUID CRYSTAL DISPLAY DEVICE

(71) Applicant: KYOCERA Corporation, Kyoto (JP)

(72) Inventor: Yuji Soda, Kusatsu (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/283,122

(22) PCT Filed: Jul. 12, 2019

(86) PCT No.: PCT/JP2019/027791
§ 371 (c)(1),
(2) Date: Apr. 6, 2021

(87) PCT Pub. No.: WO2020/084845
PCT Pub. Date: Apr. 30, 2020

(65) Prior Publication Data
US 2021/0389630 A1    Dec. 16, 2021

(30) Foreign Application Priority Data
Oct. 25, 2018 (JP) .............................. JP2018-200946

(51) Int. Cl.
*G02F 1/13363* (2006.01)
*G02F 1/1335* (2006.01)

(52) U.S. Cl.
CPC .. *G02F 1/133638* (2021.01); *G02F 1/133528* (2013.01); *G02F 1/133562* (2021.01); *G02F 2203/01* (2013.01); *G02F 2203/02* (2013.01); *G02F 2203/66* (2013.01);
(Continued)

(58) Field of Classification Search
CPC ......... G02F 1/133638; G02F 1/133562; G02F 1/133528
See application file for complete search history.

(56) References Cited

U.S. PATENT DOCUMENTS

| 2009/0180060 A1* | 7/2009 | Molsen | G02F 1/133621 349/98 |
| 2014/0267982 A1* | 9/2014 | Mitsui | G02B 5/0257 349/65 |

(Continued)

FOREIGN PATENT DOCUMENTS

JP    2007-171943 A    7/2007

*Primary Examiner* — Edmond C Lau
(74) *Attorney, Agent, or Firm* — Procopio Cory Hargreaves and Savitch LLP

(57) ABSTRACT

A liquid crystal display device includes a liquid crystal display panel including a light reflective portion, a first polarizing plate located on a display surface-facing side, a half-wavelength plate and a first quarter-wavelength plate disposed between the liquid crystal display panel and the first polarizing plate. A liquid crystal layer corresponding to the light reflective portion exhibits a retardation which is less than one-half of a retardation of the half-wavelength plate. The first quarter-wavelength plate has a slow axis which intersects a liquid-crystal molecular orientation axis at a time of no electric field application. The expression $nx1>nz1>ny1$ is satisfied, where $nx1$, $ny1$ and $nz1$ are the refractive indices at each orientation of the half-wavelength plate, and the expression $nx2>nz2=ny2$ is satisfied, where $nx2$, $ny2$ and $nz2$ are the refractive indices at each orientation of the first quarter-wavelength plate.

8 Claims, 7 Drawing Sheets

(52) U.S. Cl.
CPC ...... *G02F 2413/02* (2013.01); *G02F 2413/06* (2013.01); *G02F 2413/08* (2013.01)

(56) References Cited

U.S. PATENT DOCUMENTS

2018/0072890 A1* 3/2018 Hida .................... G02B 5/3025
2021/0294013 A1* 9/2021 Ota ......................... B29C 55/12

* cited by examiner

LIQUID CRYSTAL DISPLAY DEVICE

CROSS-REFERENCE TO RELATED APPLICATION

This application is a national stage entry according to 35 U.S.C. 371 of International Application No. PCT/JP2019/027791 filed on Jul. 12, 2019, which claims priority to Japanese Patent Application No. 2018-200946 filed on Oct. 25, 2018, the contents of which are entirely incorporated herein by reference.

TECHNICAL FIELD

The present disclosure relates to a liquid crystal display device which can be preferably implemented as a display for electronic equipment of various types, including mobile phones.

BACKGROUND

In the design of active-matrix liquid crystal displays, there have been demands for technologies that solve the problem of "black level degradation" which appears on a liquid crystal display panel for lack of a proper black level necessary for display of high quality in a normally white mode due to difficulties in minimizing the light transmittance of the liquid crystal display panel in a state of black display.

An example of technologies that solve such a problem is described in Japanese Unexamined Patent Publication JP-A 2007-171943 (Patent Literature 1). Proposed in this disclosure is an optical compensation layer-equipped polarizing plate including the following components arranged in the order named: a hard coating layer; a polarizer; a first optical compensation layer placed with a slow axis which intersects the absorbing axis of the polarizer; and a second optical compensation layer placed with a slow axis which intersects the absorbing axis of the polarizer. In this construction, the first optical compensation layer exhibits substantially a half-wave retardation with respect to the wavelength of monochromatic light, and, the second optical compensation layer exhibits substantially a quarter-wave retardation with respect to the wavelength of monochromatic light. Moreover, the hard coating layer contains urethane acrylate, polyol acrylate (methacrylate), and acrylic (methacrylic) polymer having an alkyl group containing two or more hydroxyl groups.

SUMMARY

A liquid crystal display device according to the disclosure is a liquid crystal display device of an electrically controlled birefringence type which displays a normally white mode. The liquid crystal display device includes: a liquid crystal display panel including a liquid crystal layer, and a light reflective portion which reflects incident light having passed through the liquid crystal layer from a display surface side; a first polarizing plate located on a display surface-facing side of the liquid crystal display panel; and a half-wavelength plate and a first quarter-wavelength plate, which are arranged in an order from the first polarizing plate, the half-wavelength plate and the first quarter-wavelength plate being disposed between the liquid crystal display panel and the first polarizing plate. The liquid crystal layer corresponding to the light reflective portion exhibits a retardation which is less than half of a retardation of the half-wavelength plate. The half-wavelength plate is configured to fulfill the following relationship: $nx1 > nz1 > ny1$, wherein $nx1$ and $ny1$ represent in-plane refractive indices of the half-wavelength plate in mutually perpendicular directions, and $nz1$ represents a thickness-wise refractive index of the half-wavelength plate. The first quarter-wavelength plate is configured to fulfill the following relationship: $nx2 > nz2 = ny2$, wherein $nx2$ and $ny2$ represent in-plane refractive indices of the first quarter-wavelength plate in mutually perpendicular directions, and $nz2$ represents a thickness-wise refractive index of the first quarter-wavelength plate. The first quarter-wavelength plate has a slow axis which intersects a liquid-crystal molecular orientation axis at a time when no electric field is applied.

BRIEF DESCRIPTION OF DRAWINGS

Other and further objects, features, and advantages of the disclosure will be more explicit from the following detailed description taken with reference to the drawings wherein.

DETAILED DESCRIPTION

Figure 1:
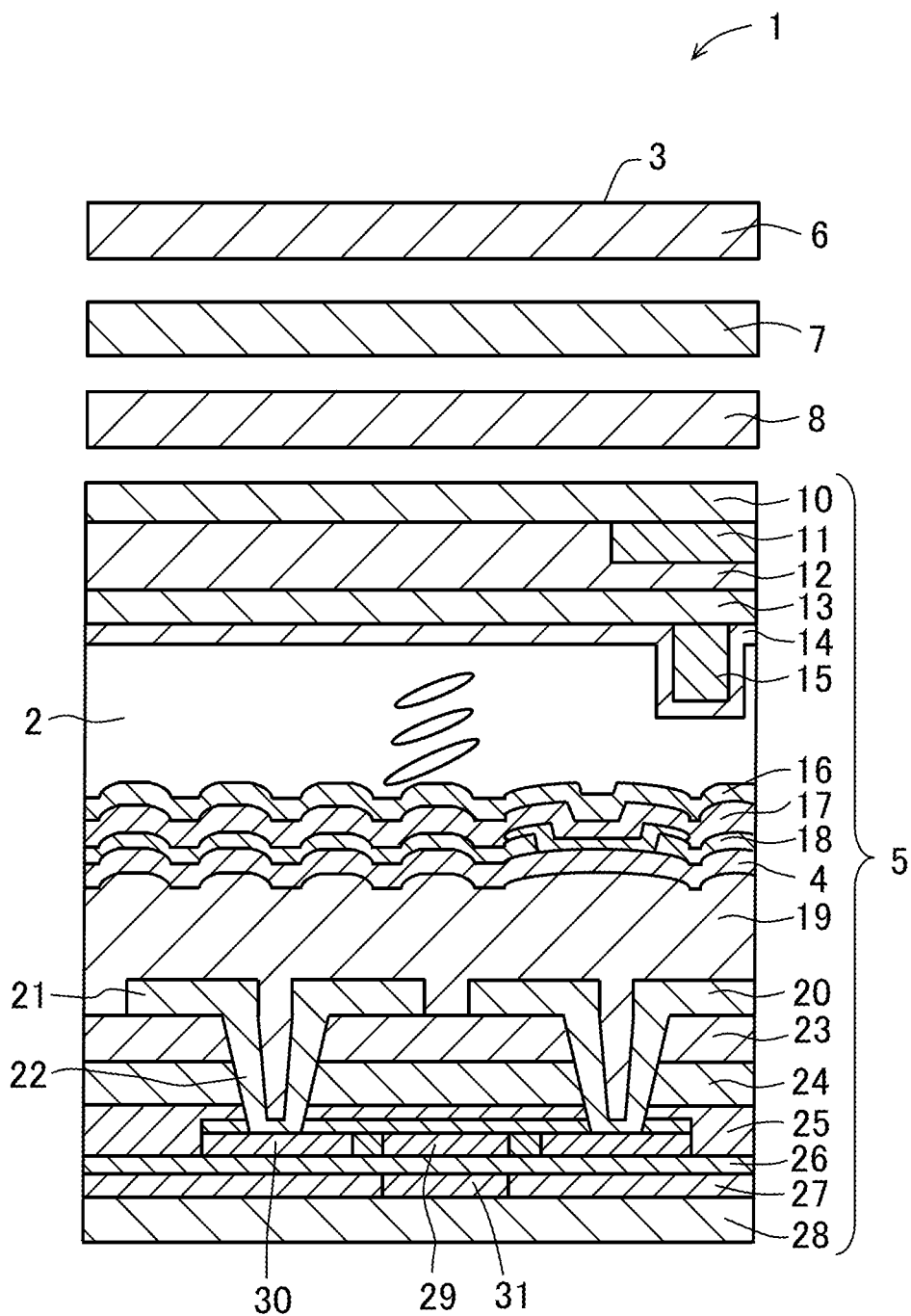
FIG. 1 is a sectional view showing the configuration of a liquid crystal display device according to an embodiment of the disclosure.
Figure 2:
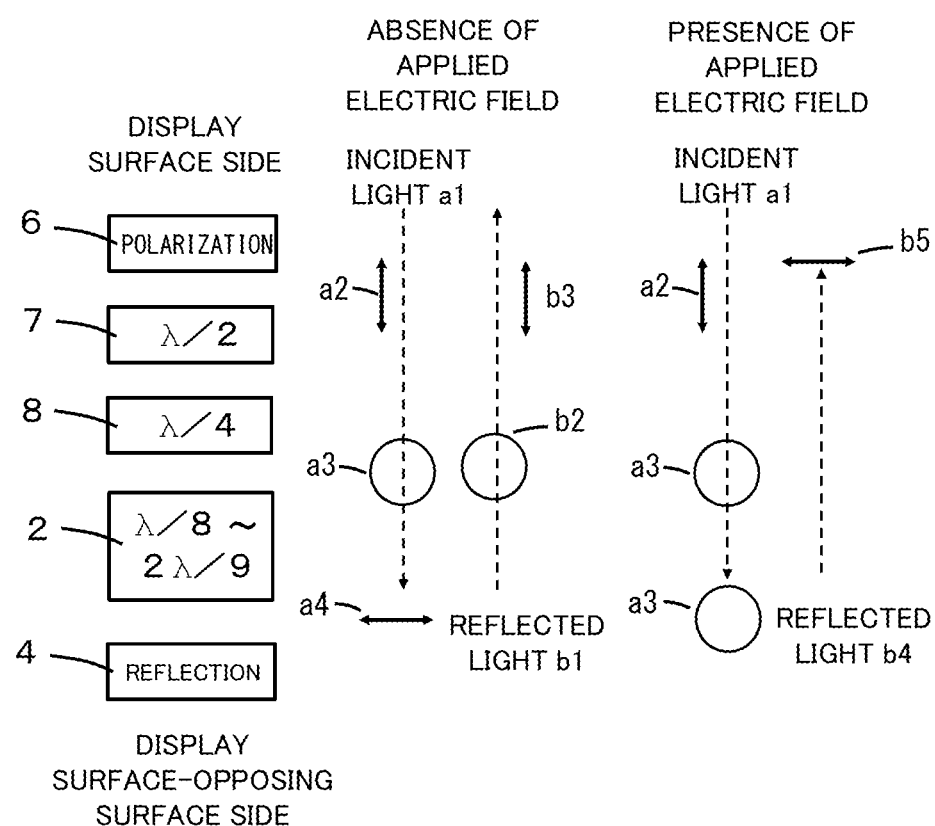
FIG. 2 is an explanatory diagram of the operation of the liquid crystal display device according to the embodiment at the time of no electric field application, as well as at the time of electric field application.
Figure 3:
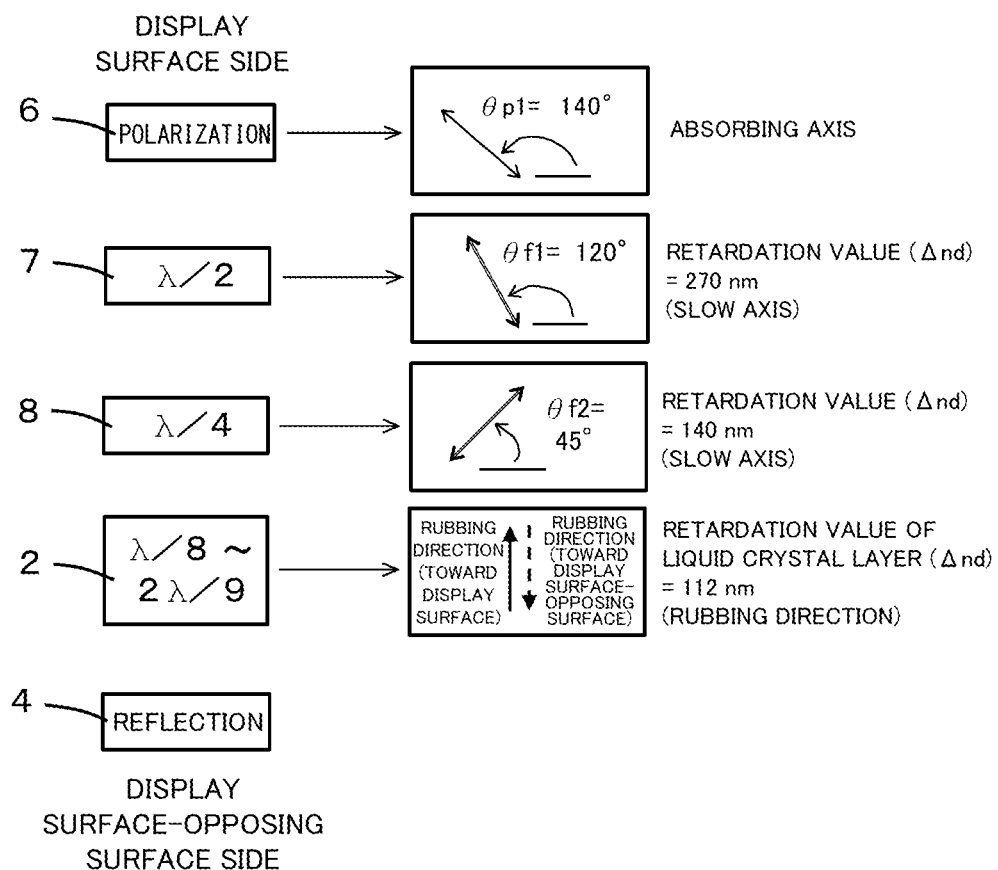
FIG. 3 is a diagram showing axis arrangement and retardation values in the liquid crystal display device according to the embodiment.
Figure 4:
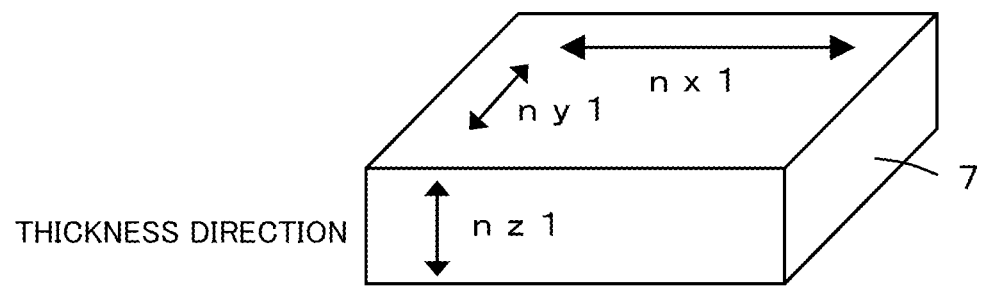
FIG. 4 is diagram showing the relationship in refractive index between the half-wavelength plate and the first quarter-wavelength plate in the liquid crystal display device according to the embodiment.
Figure 4:
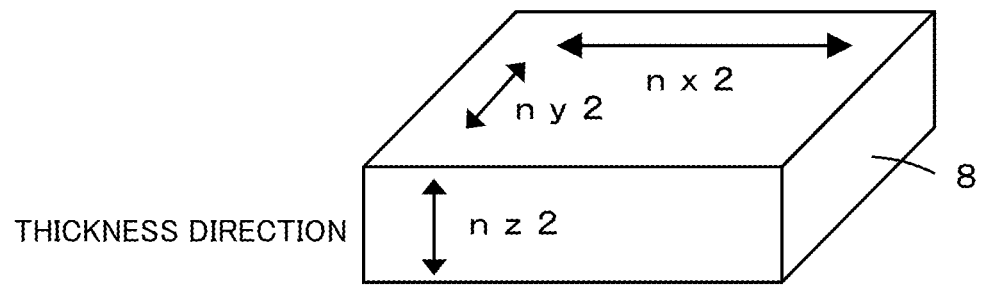

FIG. 1 is a sectional view showing the configuration of a liquid crystal display device according to an embodiment of the disclosure. FIG. 2 is an explanatory diagram of the operation of the liquid crystal display device at the time of no electric field application, as well as at the time of electric field application. FIG. 3 is a diagram showing axis arrangement and retardation values in the liquid crystal display device. FIG. 4 is diagram showing the relationship in refractive index between a half-wavelength plate and a first quarter-wavelength plate of the disclosure.

A liquid crystal display device 1 according to this embodiment as shown in FIGS. 1 to 4 is a reflective liquid crystal display of an electrically controlled birefringence type which carries out display in the normally white mode. The liquid crystal display device 1 includes: a liquid crystal display panel 5 including a liquid crystal layer 2, and a light reflective layer 4 which reflects incident light from a display surface 3 side having passed through the liquid crystal layer 2; a first polarizing plate 6 located on a display surface 3-facing side of the liquid crystal display panel 5; and a half-wavelength plate 7 and a first quarter-wavelength plate 8 disposed between the liquid crystal display panel 5 and the first polarizing plate 6.

The related art has already provided an optical compensation layer-equipped polarizing plate that is conducive to downsizing, is highly abrasion-resistant and impervious to moisture and heat, affords high viewing-angle compensation effects, produces broadband circularly polarized light, prevents lack of thermal uniformity, and reduces light leakage in a state of black display, and also an image display device incorporating the polarizing plate. However, there have been no specific proposals for technologies that adapt both a reflective region and a transmissive region to the normally white mode, as well as technologies that prevent the display surface of a liquid crystal display device of an electrically controlled birefringence (ECB for short) type from appearing with black level degradation on a wide frequency band, and also permit improvement in viewing angle.

As to the mode of operation of the liquid crystal display device of the electrically controlled birefringence type, liquid crystal molecules align parallel to the surface of a substrate in a condition of applying no electric field to a liquid crystal layer (initial alignment state), and, in response to a gradual increase in magnitude of the electric field applied to the liquid crystal layer, as a predetermined threshold value of electric field is exceeded, the liquid crystal molecules start to rise gradually relative to the substrate surface, and are eventually oriented perpendicularly to the substrate surface under high-voltage conditions.

The disclosure therefore aims to allow a liquid crystal display device of an electrically controlled birefringence which carries out display in the normally white mode to attain, at the time of voltage application, a proper black level to reduce the appearance of black level degradation and ensure high-quality display on a wide frequency band, and also attain a proper white level to ensure high-quality display at the time of no voltage application.

The liquid crystal layer 2 for a light reflective portion 47 exhibits a retardation which is less than one-half of the retardation of the half-wavelength plate 7, and, the first quarter-wavelength plate 8 includes a slow axis which intersects a liquid-crystal molecular orientation axis at a time of no electric field application. Moreover, the half-wavelength plate 7 is configured to fulfill the following relationship: $nx1>nz1>ny1$, wherein $nx1$ and $ny1$ represent in-plane refractive indices in mutually perpendicular directions, and $nz1$ represents a thickness-wise refractive index, and, the first quarter-wavelength plate 8 is configured to fulfill the following relationship: $nx2>nz2=ny2$, wherein $nx2$ and $ny2$ represent in-plane refractive indices in mutually perpendicular directions, and $nz2$ represents a thickness-wise refractive index. This design permits improvement in viewing angle dependence, thus achieving a normally white mode that ensures high-quality display with a wide viewing angle.

The liquid crystal display panel 5 includes: a first substrate 10; a light shielding layer 11; a color filter layer 12; a common electrode 13; a first alignment layer 14; a columnar portion 15; a liquid crystal layer 2; a second alignment layer 16; a transparent electrode 17; a fifth interlayer insulating layer 18; a light reflective layer 4; a fourth interlayer insulating layer 19; a drain electrode 20; a source electrode 21; an interlayer connection portion 22; a third interlayer insulating layer 23; a second interlayer insulating layer 24; a first interlayer insulating layer 25; a second gate insulating layer 26; a first gate insulating layer 27; a second substrate 28; a channel portion 29; a semiconductor layer 30; and a gate electrode 31.

The aforementioned drain electrode 20, source electrode 21, interlayer connection portion 22, channel portion 29, semiconductor layer 30, and gate electrode 31 constitute a thin-film transistor (TFT for short) which serves as an active device. The drain electrode 20 is connected as by the interlayer connection portion 22 to the light reflective layer 4 which serves as a pixel electrode. A gate signal line connected to the gate electrode 31 is provided for each pixel row in a matrix of pixel groups, and a source signal line connected to the source electrode 21 is provided for each pixel column in the pixel-group matrix. Pixels are each formed in correspondence with a point of intersection of the gate signal line and the source signal line.

A glass substrate is used to construct the first substrate 10 and the second substrate 28. The light shielding layer 11 constitutes a black matrix. When viewed in plan from the top of FIG. 1, the light shielding layer 11 is located between the pixels for pixel demarcation. The common electrode 13, which is made of, for example, indium tin oxide (ITO for short), constitutes a transparent electrode layer. The first alignment layer 14 and the second alignment layer 16 are each made of polyimide, for example. The fourth interlayer insulating layer 19 is made of acrylic resin, for example. The first to third interlayer insulating layers 25, 24, and 23 and the first and second gate insulating layers 26 and 27 are each made of silicon oxide (SiO) or silicon nitride (SiN). The light reflective layer 4 is made of molybdenum (Mo), aluminum (Al), etc. For example, the light reflective layer 4 is formed by laminating an Al layer on a Mo layer.

The thin-film transistor includes the semiconductor layer 30 made of, for example, amorphous silicon (a-Si) or low-temperature poly silicon (LTPS for short), and has the form of a three-terminal device including the gate electrode 31, the source electrode 21, and the drain electrode 20. Thus constructed, the thin-film transistor serves as a switching device (gate transfer device) that permits the passage of electric current through the semiconductor layer 30 (channel) between the source electrode 21 and the drain electrode 20 by the application of a voltage of certain potential (e.g. 3 V or 6 V) to the gate electrode 31.

The liquid crystal display panel 5 is an electrically controlled birefringence (ECB for short) LCD panel that has undergone a homogeneous alignment process so that liquid crystal molecules align parallel to each of the opposed surfaces of the first and second substrates 10 and 28 (initial alignment state) in a condition of applying no electric field to the liquid crystal layer 2. In response to a gradual increase in the level of a voltage applied to the liquid crystal display panel 5, as a certain threshold value of voltage is exceeded, the liquid crystal molecules start to rise gradually relative to each of the surfaces of the first and second substrates 10 and 28, and are eventually oriented perpendicularly to each of the surfaces of the first and second substrates 10 and 28 at a high voltage of a level higher than or equal to a prescribed value.

Liquid crystal is a medium with refractive index anisotropy in which a light wave corresponding to the direction of the axis of liquid-crystal molecular alignment (X axis) and a light wave corresponding to a direction perpendicular to the axis of liquid-crystal molecular alignment (Y axis) propagate at different rates. In other words, the X axis and the Y axis differ from each other in lightwave refractive index. The difference between the X-axis refractive index (nx) and the Y-axis refractive index (ny) is defined as a birefringence index: Δn (=nx−ny).

After entering the liquid crystal layer 2, a light wave corresponding to the X axis and a lightwave corresponding to the Y axis propagate at different rates, and thus a phase shift occurs between the X-axis lightwave and the Y-axis lightwave upon exit from the liquid crystal layer 2. The phase shift is known as "phase difference" or "retardation". Given that the wavelength of incident light is λ, the thickness of the liquid crystal layer 2 is d, and the birefringence index is Δn, then the retardation δ is expressed in the following equation (1), and may also be expressed in the notation "Δn·d (nm)".

$$\delta = 2\pi \cdot \Delta n \cdot d / \lambda \quad (1)$$

The inventor of the disclosure has found that the liquid crystal display device 1 of the electrically controlled birefringence type which carries out display in the normally white mode takes on a satisfactory normally-white display color tone (near-achromatic color), that is; attains a proper white level under conditions where the retardation of the liquid crystal layer 2 is less than one-half of the retardation of the half-wavelength plate 7, and more specifically, the liquid crystal layer 2 exhibits a retardation of 112 nm for the case of this embodiment (for example, at a wavelength of 550 nm, the half-wavelength plate 7 exhibits a half-wavelength retardation, viz., a retardation of about 275 nm (270 nm for the case of this embodiment)), and also found that arranging the half-wavelength plate 7 and the first quarter-wavelength plate 8 attached to the liquid crystal display panel 5 with their slow axes oriented in predetermined directions permits improvements in normally-white display color and in black color obtained at the time of electric field application.

The inventor of the disclosure has produced different samples of the liquid crystal display device, namely an example 1 and a comparative example 1 to check for improvement in visibility in the normally white mode. In producing these samples, the liquid crystal layer 2 was set for a retardation value of 112 nm, and, a polarizing plate manufactured under the trade name of "TEG1465DUHC" by NITTO DENKO CORPORATION was used as the first polarizing plate 6. Moreover, the example 1 employed "NAZ film" (trade name) manufactured by NITTO DENKO CORPORATION as the half-wavelength plate 7. The NAZ film has a retardation value of 270 nm, and fulfills the following relationships: nx1>nz1>ny1; and Nz1=0.5 (nx1=1.52196, ny1=1.52, and nz1=1.52098). Note that Nz1 equals (nx1−nz1)/(nx1−ny1). The comparative example 1 employed "ZEONOR film" (trade name) manufactured by ZEON CORPORATION as the half-wavelength plate 7. The ZEONOR film has a retardation value of 270 nm, and fulfills the following relationships: nx>ny=nz; and Nz=1.0 (nx=1.52794, ny=1.52, and nz=1.52). Note that Nz equals (nx−nz)/(nx−ny).

The example 1 and the comparative example 1 each employed "ZEONOR film" (trade name) manufactured by ZEON CORPORATION as the first quarter-wavelength plate 8. The ZEONOR film has a retardation value of 140 nm, and fulfills the following relationships: nx2>ny2=nz2; and Nz2=1.0 (nx2=1.52424, ny2=1.52, and nz2=1.52). Note that Nz2 equals (nx2−nz2)/(nx2−ny2). Each of the samples of the example 1 and the comparative example 1 was subjected to measurement of reflectance in a state of black display at the time of electric field application, reflectance in a state of white display at the time of no electric field application, and reflection-contrast ratio using "CM-2600d Spectrophotometer" manufactured by KONICA MINOLTA JAPAN, Inc.

Experimental results showed that the sample of the example 1 exhibited a reflectance of 0.45% in the black-display state, a reflectance of 17.5% in the white-display state, and a reflection-contrast ratio of 39:1, whereas the sample of the comparative example 1 exhibited a reflectance of 0.59% in the black-display state, a reflectance of 17.8% in the white-display state, and a reflection-contrast ratio of 30:1. These findings have proven that the sample of the example 1 provides good visibility in the black-display state.

Moreover, in the sample of the example 1, the display surface 3 of the liquid crystal display device showed no signs of the appearance of black level degradation and provided good visibility even when viewed from in front obliquely from above, below, right, and left (when viewed from directions inclined at about 50° relative to a line perpendicular to the display surface 3). On the other hand, the sample of the comparative example 1 showed signs of the appearance of black level degradation when viewed from a direction inclined at about 50° relative to a line perpendicular to the display surface 3 of the liquid crystal display device, suffered from visibility deterioration due to decreased reflection-contrast ratio, and caused appreciable changes in white color in the direction of viewing display in the white-display state.

Moreover, it has been found out that setting the retardation of the liquid crystal layer 2 at below one-half of the retardation of the half-wavelength plate 7 makes it possible to attain a white level that ensures high-quality display, and thereby provide enhanced visibility in the white-display state. However, setting the retardation of the liquid crystal layer 2 at below one-quarter of the retardation of the half-wavelength plate 7, for example, setting the value of retardation of the liquid crystal layer 2 at 65 nm, has been found to pose a tendency to lower the reflectance in the white-display state, which results in visibility deterioration. It will thus be seen that the retardation of the liquid crystal layer 2 preferably falls in a range of one-quarter or greater of the retardation of the half-wavelength plate 7 and one-half or less of the retardation thereof, or more preferably a range of one-quarter or greater of the retardation of the half-wavelength plate 7 and four-ninths or less of the retardation thereof. This design can provide a white level that ensures display of even higher quality.

Referring to FIGS. 2 and 3, and also FIG. 4, assuming that a direction perpendicular to the direction of viewing the liquid crystal display panel 5 from the display surface 3 side, viz., the initial alignment direction of liquid crystal molecules at the time of no electric field application (rubbing direction) corresponds to a reference axis (=0°), and an angle which each axis forms with the reference axis in a counterclockwise direction corresponds to a slow-axis angle, then the absorbing axis of the first polarizing plate 6 is at an angle θp1 of 140°. Moreover, the slow axis of the half-wavelength plate 7 is at an angle θf1 of 120° (retardation value Δnd=270 nm), and the slow axis of the first quarter-wavelength plate 8 is at an angle θf2 of 45° (retardation value Δnd=140 nm).

Moreover, the half-wavelength plate 7 is preferably designed to satisfy, where in-plane refractive indices in mutually perpendicular directions are defined as nx1 and ny1, respectively (nx1>ny1) and a thickness-wise refractive index is defined as nz1, the following conditions: nz1 is greater than ny1 (nx1>nz1>ny1); and a value expressed in equation form as: Nz1=(nx1−nz1)/(nx1−ny1) is greater than 0 and less than or equal to 0.7, or more preferably the value falls in a range of 0.3 or greater and 0.7 or less. This design can provide a normally white mode that ensures display of higher quality with a wider viewing angle.

Moreover, the first quarter-wavelength plate 8 is preferably constructed of a uniaxial retarder film designed to satisfy, where in-plane refractive indices in mutually perpendicular directions are defined as nx2 and ny2, respectively, and a thickness-wise refractive index is defined as nz2, the following condition: nx2>nz2=ny2. In the uniaxial retarder film, the relationship "nz2=ny2" is construed as encompassing not only equality between nz2 and ny2 but also cases where nz2 and ny2 differ slightly from each other, that is; nz2 and ny2 are substantially equal. In such a case, a value expressed in equation form as: Nz2=(nx2−nz2)/(nx2−ny2) falls in a range of 0.8 or greater and 1.2 or less. This design permits control of the liquid crystal display panel 5 so that the display surface 3 will not appear with black level degradation at the time of electric field application even when viewed from in front obliquely from above, below, right, and left (when viewed from directions inclined at about 50° relative to a line perpendicular to the display surface 3), thus enabling a black-display state at a black level that ensures high-quality display with a wide viewing angle, with consequent improvement in viewing angle dependence in the normally white mode.

Moreover, as shown in FIG. 3, in the liquid crystal display device pursuant to the disclosure, the slow axis of the half-wavelength plate 7 (θf1=120° in the example shown in FIG. 3) and the slow axis of the first quarter-wavelength plate 8 (θf2=45° in the example shown in FIG. 3) preferably intersect each other at an angle of intersection in a range of 60° or greater and 90° or less. This design can provide a normally white mode that ensures display of higher quality with a wider viewing angle. That is, at the time of voltage application, a black level that ensures high-quality display on a wide frequency band can be attained for further reduction of black level degradation appearance, and, at the time of no voltage application, a white level that ensures display of even higher quality can be attained. The described angles of intersection below 60° pose a tendency to cause a decreased black level. The angles of intersection above 90° also pose a tendency to cause a decreased black level.

The slow axis of the first quarter-wavelength plate 8 and the liquid-crystal molecular orientation axis at the time of no electric field application preferably intersect each other at about 45°. This design can provide a black level that ensures high-quality display in the normally white mode at the time of electric field application. As used herein the term "about 45°" includes the 45°±about 5° range. The angles of intersection beyond this range pose a tendency to cause the appearance of black level degradation which results in a decrease in contrast.

The following describes display on the liquid crystal display device 1 with reference to FIG. 2. External light incident on the display surface 3 side of the liquid crystal display device 1 as randomly polarized light a1 is converted into linearly polarized light (defined as linearly polarized light a2) by the first polarizing plate 6. Upon passing through the half-wavelength plate 7 and the first quarter-wavelength plate 8, the linearly polarized light a2 becomes broadband circularly polarized light (defined as circularly polarized light a3).

The application of an electric field to the liquid crystal layer 2 brings the liquid crystal layer 2 to the zero retardation state. Thus, the light which has been converted into the broadband circularly polarized light a3 through the half-wavelength plate 7 and the first quarter-wavelength plate 8 passes, while remaining in the form of the broadband circularly polarized light a3, through the liquid crystal layer 2, and is then reflected from the light reflective layer 4. Reflected light b4 resulting from the reflection of the broadband circularly polarized light a3 passes once again through the liquid crystal layer 2, the first quarter-wavelength plate 8, and the half-wavelength plate 7 so as to become linearly polarized light b5 which is perpendicular to the direction in which the first polarizing plate 6 carries out polarization. There can be thus obtained a black level that ensures high-quality display, that is; a black-display state with little appearance of black level degradation.

On the other hand, with no electric field applied to the liquid crystal layer 2, the light which has been converted into linearly polarized light a4 through the liquid crystal layer 2 is, while remaining in the form of the linearly polarized light a4, reflected by the light reflective layer 4 so as to become reflected light b1. The reflected light b1 resulting from the reflection of the linearly polarized light a4 passes once again through the liquid crystal layer 2, the first quarter-wavelength plate 8, and the half-wavelength plate 7 so as to become linearly polarized light b3 which is parallel to the polarizing direction of the first polarizing plate 6, thus enabling the white-display state.

Figure 5:
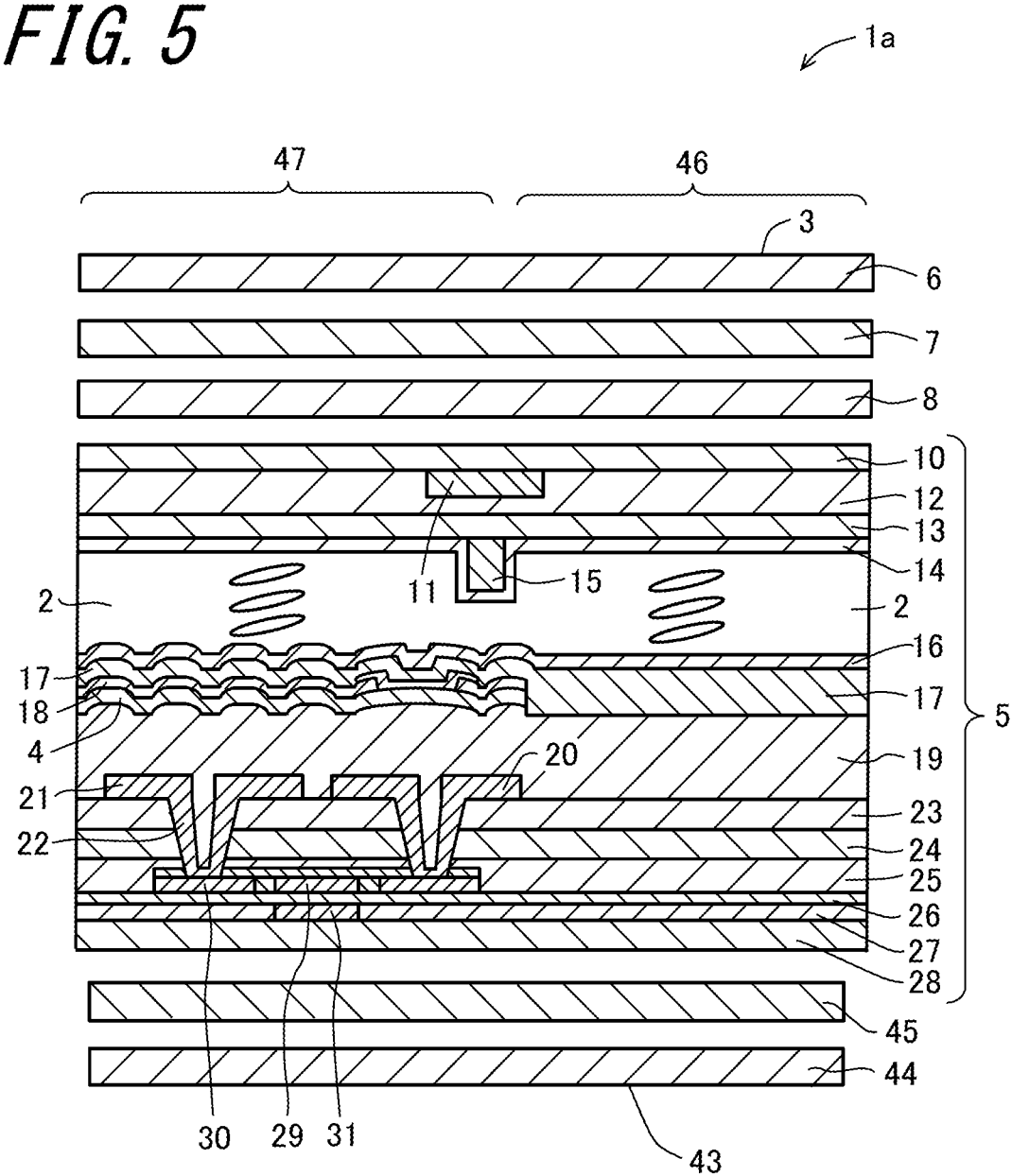
FIG. 5 is a sectional view showing a liquid crystal display device according to another embodiment of the disclosure.
Figure 6:
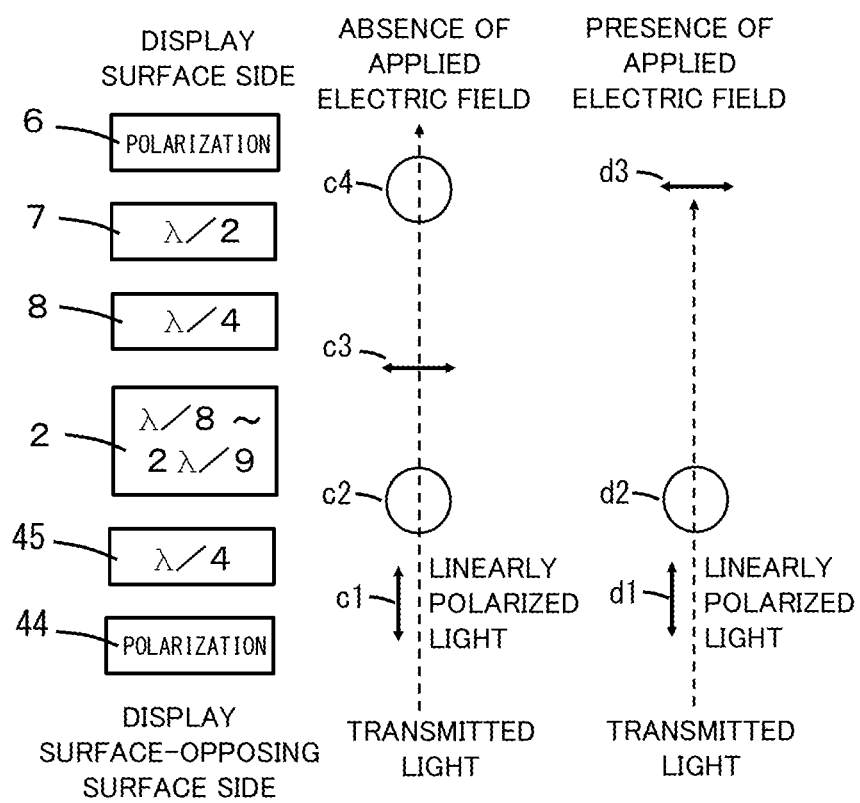
FIG. 6 is an explanatory diagram of the operation of the liquid crystal display device according to another embodiment at the time of no electric field application, as well as at the time of electric field application.
Figure 7:
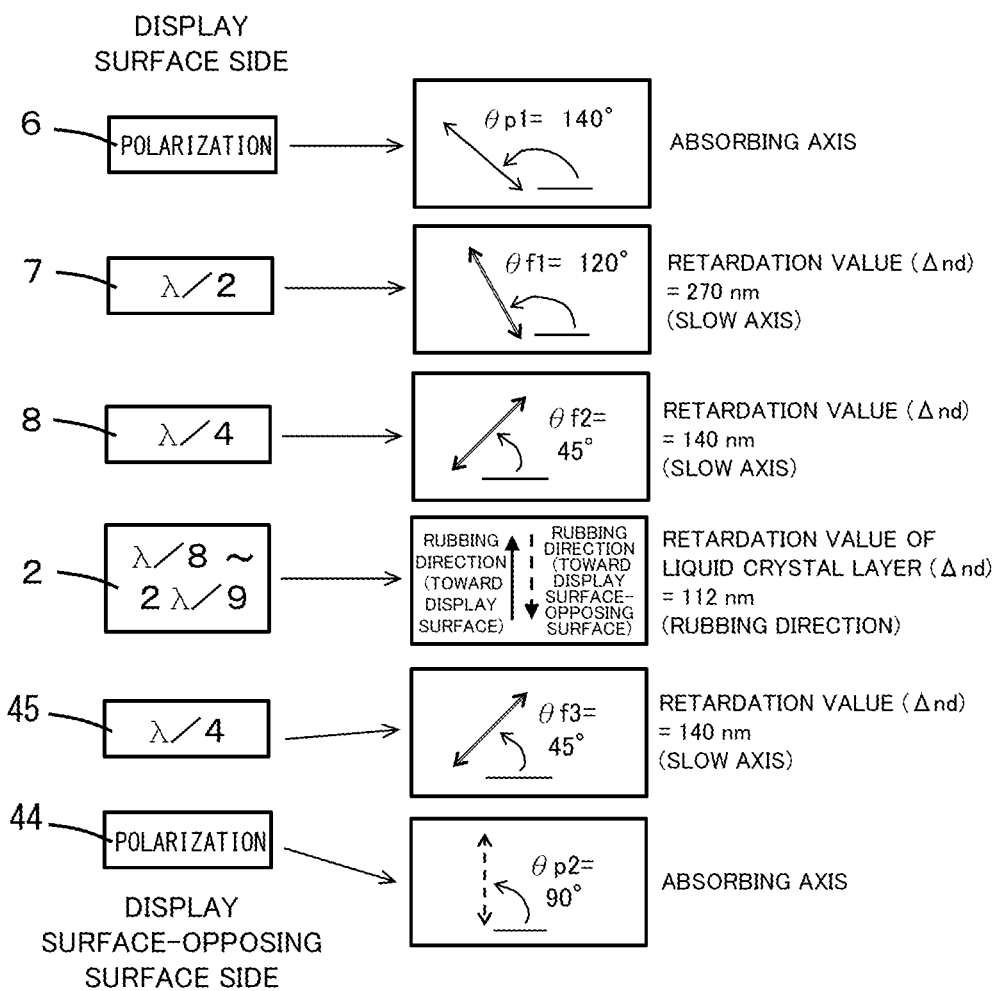
FIG. 7 is a diagram showing axis arrangement and retardation values in the liquid crystal display device according to another embodiment.

FIG. 5 is a sectional view showing a liquid crystal display device 1a according to another embodiment of the disclosure. FIG. 6 is an explanatory diagram of the operation of the liquid crystal display device 1a at the time of no electric field application, as well as at the time of electric field application. FIG. 7 is a diagram showing the axis arrangement of the liquid crystal display device 1a. Note that the constituent components of this embodiment corresponding to those of the preceding embodiment are given similar reference symbols, and overlapping descriptions will be omitted. In the liquid crystal display device 1a, a liquid crystal layer 2 in a light reflective portion 47 and a liquid crystal layer 2 in a light transmissive portion 46 are identical in retardation.

The liquid crystal display device 1a according to this embodiment includes: a second polarizing plate 44 located on a display surface-opposing surface 43-facing side of the liquid crystal display panel 5; and a second quarter-wavelength plate 45 disposed between the liquid crystal display panel 5 and the second polarizing plate 44. The liquid crystal display device 1a is a so-called transflective liquid crystal display including, in the liquid crystal layer 2, a light transmissive portion 46 which transmits incident light from the display surface-opposing surface 43-facing side of the liquid crystal display panel 5 (including both of light reflective area and light transmissive area). A backlight unit may be optionally mounted on the display surface-opposing surface 43 side, though basically not necessary.

The second quarter-wavelength plate 45 has a slow axis which intersects at about 45° the liquid-crystal molecular orientation axis at the time of no electric field application. As used herein the term "about 45°" includes the 45°±about 5° range. The angles of intersection beyond this range pose a tendency to cause a low-contrast problem.

The following describes display on the liquid crystal display device 1a. The liquid crystal display panel 5 includes, in the liquid crystal layer 2, the light transmissive portion 46 which transmits incident light from the display surface-opposing surface 43 side. As shown in FIG. 6, with no electric field applied to the liquid crystal layer 2, incident light from the display surface-opposing surface 43-facing side of the liquid crystal display panel 5 is converted into linearly polarized light c1 by the second polarizing plate 44. Upon passing through the second quarter-wavelength plate 45, the linearly polarized light c1 becomes circularly polarized light c2. Upon passing through the liquid crystal layer 2, the circularly polarized light c2 becomes linearly polarized light c3. Upon passing through the first quarter-wavelength plate 8 and the half-wavelength plate 7, the linearly polarized light c3 becomes circularly polarized light or elliptically polarized light c4. Of the circularly polarized light or elliptically polarized light c4, only the light portions parallel to the polarizing direction of the first polarizing plate 6 are allowed to pass, thus enabling the white-display state.

On the other hand, with an electric field applied to the liquid crystal layer 2, incident light from the display surface-opposing surface 43 side passes through the second polarizing plate 44 so as to become linearly polarized light d1. The linearly polarized light d1 is converted into circularly polarized light d2 by the second quarter-wavelength plate 45. The circularly polarized light d2 passes, while remaining in the form of the circularly polarized light d2, through the liquid crystal layer 2, and, upon passing through the second quarter-wavelength plate 8 and the half-wavelength plate 7, the circularly polarized light d2 becomes linearly polarized light d3. The direction of polarization of the linearly polarized light d3 is perpendicular to the polarizing direction of the first polarizing plate 6, in consequence whereof there results no external emission of the linearly polarized light d3 from the first polarizing plate 6. There can be thus realized the so-called transflective liquid crystal display device that enables a black-display state for display of high quality.

Referring to FIGS. 6 and 7, assuming that a direction perpendicular to the direction of viewing the liquid crystal display panel 5 from the display surface 3 side, viz., the initial alignment direction of liquid crystal molecules at the time of no electric field application (rubbing direction) corresponds to a reference axis (=0°), and, an angle which each axis forms with the reference axis in a counterclockwise direction corresponds to a slow-axis angle, then the absorbing axis of the first polarizing plate 6 is at an angle $\theta p1$ of 140°. Moreover, the slow axis of the half-wavelength plate 7 is at an angle $\theta f1$ of 120° (retardation value $\Delta nd=270$ nm), and the slow axis of the first quarter-wavelength plate 8 is at an angle $\theta f2$ of 45° (retardation value $\Delta nd=140$ nm), and also the slow axis of the second quarter-wavelength plate 45 is at an angle $\theta f3$ of 45° (retardation value $\Delta nd=140$ nm), and the absorbing axis of the second polarizing plate 44 is at an angle $\theta p2$ of 90°. "ZEONOR film" (trade name) manufactured by ZEON CORPORATION was used as the second quarter-wavelength plate 45. The ZEONOR film has a retardation value of 140 nm, and fulfills the following relationships: nx>ny=nz; and Nz=1.0 (nx=1.52424, ny=1.52, and nz=1.52). Note that Nz equals (nx−nz)/(nx−ny). "TEG1465DUHC" (trade name) manufactured by NITTO DENKO CORPORATION was used as the second polarizing plate 44.

It is preferred that the slow axis of the second quarter-wavelength plate 45 and the liquid-crystal molecular orientation axis at the time of no electric field application intersect each other at about 45°, and the slow axis of the second quarter-wavelength plate 50 and the slow axis of the first quarter-wavelength plate 8 be substantially parallel to each other. This design can provide a black level that ensures high-quality display in the normally white mode at the time of electric field application. As used herein the term "about 45°" includes the 45°±about 5° range. The angles of intersection beyond this range pose a tendency to cause a low-contrast problem.

Moreover, preferably, the light transmissive portion 46 can be greater in retardation than the light reflective portion 47, and the light transmissive portion 46 and the light reflective portion 47 in the liquid crystal layer 2 can be made in a multi-gap structure, that is; a cell-gap adjustment layer for the liquid crystal layer 2 can be provided. This design allows high contrast to be achieved both in a state of reflection display and in a state of transmission display. In this case, the liquid crystal layer 2 corresponding to the light transmissive portion 46 can be greater in retardation than the liquid crystal layer 2 corresponding to the light reflective portion 47. The retardation of the liquid crystal layer 2 corresponding to the light transmissive portion 46 is preferably set in a range of above one-fold retardation of the liquid crystal layer 2 corresponding to the light reflective portion 47 and twice said retardation or less. More preferably, the retardation of the liquid crystal layer 2 corresponding to the light transmissive portion 46 is set in a range of one-third or greater of the retardation of the half-wavelength plate 7 and eight-ninths or less of the retardation of the half-wavelength plate 7. Setting the retardation of the liquid crystal layer 2 corresponding to the light transmissive portion 46 at below one-third of the retardation of the half-wavelength plate 7 poses a tendency to cause a decrease in transmissivity and a decrease in contrast in the light transmissive portion 46. Setting the retardation of the liquid crystal layer 2 corresponding to the light transmissive portion 46 at above eight-ninths of the retardation of the half-wavelength plate 7 shows a tendency to cause a decrease in contrast in the light transmissive portion 46. Still more preferably, the retardation of the liquid crystal layer 2 corresponding to the light transmissive portion 46 is set at about twice the retardation of the liquid crystal layer 2 corresponding to the light reflective portion 47, and also the retardation of the liquid crystal layer 2 corresponding to the light transmissive portion 46 is set in a range of twice or greater the retardation of the half-wavelength plate 7 and eight-ninths or less of the retardation of the half-wavelength plate 7.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description and all changes which come within the meaning and the range of equivalency of the claims are therefore intended to be embraced therein.

REFERENCE SIGNS LIST 1, 1a: Liquid crystal display device
2: Liquid crystal layer
3: Display surface
4: Light reflective layer
5: Liquid crystal display panel
6: First polarizing plate
7: Half-wavelength plate
8: First quarter-wavelength plate
10: First substrate
11: Light shielding layer
12: Color filter layer
13: Common electrode
14: First alignment layer
15: Columnar portion
16: Second alignment layer
17: Transparent electrode 18: Fifth interlayer insulating layer
19: Fourth interlayer insulating layer
20: Drain electrode
21: Source electrode
22: Interlayer connection portion
23: Third interlayer insulating layer
24: Second interlayer insulating layer
25: First interlayer insulating layer
26: Second gate insulating layer
27: First gate insulating layer
28: Second substrate
29: Channel portion
30: Semiconductor layer
31: Gate electrode
43: Display surface-opposing surface
44: Second polarizing plate
45: Second quarter-wavelength plate
46: Light transmissive portion
47: Light reflective portion

The invention claimed is:

1. A liquid crystal display device of an electrically controlled birefringence type which displays a normally white mode, the liquid crystal display device comprising:
a liquid crystal display panel comprising a liquid crystal layer, and a light reflective portion which reflects incident light having passed through the liquid crystal layer from a display surface side;
a first polarizing plate located on a display surface-facing side of the liquid crystal display panel; and
a half-wavelength plate and a first quarter-wavelength plate, which are arranged in an order from the first polarizing plate, the half-wavelength plate and the first quarter-wavelength plate being disposed between the liquid crystal display panel and the first polarizing plate,
the liquid crystal layer corresponding to the light reflective portion exhibiting a retardation which is less than half of a retardation of the half-wavelength plate,
the half-wavelength plate being configured to fulfill a following relationship: $nx1>nz1>ny1$, in which $nx1$ and $ny1$ represent in-plane refractive indices of the half-wavelength plate in mutually perpendicular directions, and $nz1$ represents a thickness-wise refractive index of the half-wavelength plate,
the first quarter-wavelength plate being configured to fulfill a following relationship: $nx2>nz2=ny2$, in which $nx2$ and $ny2$ represent in-plane refractive indices of the first quarter-wavelength plate in mutually perpendicular directions, and $nz2$ represents a thickness-wise refractive index of the first quarter-wavelength plate,
the first quarter-wavelength plate having a slow axis which intersects a liquid-crystal molecular orientation axis at a time when no electric field is applied.

2. The liquid crystal display device according to claim 1, wherein the retardation of the liquid crystal layer falls in a range of one-quarter or greater of the retardation of the half-wavelength plate and four-ninths or less of the retardation of the half-wavelength plate.

3. The liquid crystal display device according to claim 1, wherein the half-wavelength plate is configured so that $Nz1$ is greater than 0 and less than or equal to 0.7, and a relationship among $nx1$, $ny1$, and $nz1$ is expressed as: $Nz1=(nx1-nz1)/(nx1-ny1)$.

4. The liquid crystal display device according to claim 1, wherein the first quarter-wavelength plate is configured so that $Nz2$ is greater than or equal to 0.8 and less than or equal to 1.2, and a relationship among $nx2$, $ny2$, and $nz2$ is expressed as: $Nz2=(nx2-nz2)/(nx2-ny2)$.

5. The liquid crystal display device according to claim 1, wherein a slow axis of the half-wavelength plate and the slow axis of the first quarter-wavelength plate intersect each other at an angle of intersection in a range of 60° or greater to 90° or less.

6. The liquid crystal display device according to claim 1, wherein the slow axis of the first quarter-wavelength plate and the liquid-crystal molecular orientation axis intersect each other at about 45° at the time when no electric field is applied.

7. The liquid crystal display device according to claim 1, wherein the liquid crystal display panel comprises a light transmissive portion which allows incident light from a display surface-opposing surface side to pass through the liquid crystal layer,
wherein a second polarizing plate is located on a display surface-opposing surface-facing side of the liquid crystal display panel,
wherein a second quarter-wavelength plate is disposed between the liquid crystal display panel and the second polarizing plate, and
wherein a slow axis of the second quarter-wavelength plate and the liquid-crystal molecular orientation axis intersect each other at about 45° at the time when no electric field is applied.

8. The liquid crystal display device according to claim 7, wherein the liquid crystal layer corresponding to the light transmissive portion is greater in retardation than the liquid crystal layer corresponding to the light reflective portion.

* * * * *